United States Patent [19]
Presser et al.

[11] Patent Number: 5,564,780
[45] Date of Patent: Oct. 15, 1996

[54] CHILD RESTRAINT SEAT

[75] Inventors: Dwight W. Presser, Royal Oak; Stephen C. Bruck, Fraser; Lon L. Monsrud, Howell, all of Mich.

[73] Assignee: Douglas & Lomason Company, Farmington Hills, Mich.

[21] Appl. No.: 312,291

[22] Filed: Sep. 26, 1994

[51] Int. Cl.⁶ .................................................. B60N 2/30
[52] U.S. Cl. ........................................... 297/238; 297/61
[58] Field of Search .......................... 297/14, 238, 16

[56] References Cited

U.S. PATENT DOCUMENTS

| | | |
|---|---|---|
| 2,584,481 | 2/1952 | Mast et al. . |
| 3,594,037 | 7/1971 | Sherman ................................. 297/14 |
| 4,460,215 | 7/1984 | Chamberlain et al. ................. 297/14 |
| 4,533,176 | 8/1985 | Wyttenbach .......................... 297/238 |
| 4,902,069 | 2/1990 | Lehnert ................................... 297/14 |
| 4,986,600 | 1/1991 | LeBlanc et al. ...................... 297/238 |
| 5,026,118 | 6/1991 | Vander Stel et al. . |
| 5,100,199 | 3/1992 | Vander Stel et al. . |
| 5,202,668 | 2/1994 | Heussner .............................. 297/238 |

FOREIGN PATENT DOCUMENTS

| | | |
|---|---|---|
| 2665399 | 2/1992 | France . |
| 2454573 | 11/1974 | Germany . |

*Primary Examiner*—Peter R. Brown
*Attorney, Agent, or Firm*—Harness, Dickey & Pierce, P.L.C.

[57] ABSTRACT

The present invention is directed to a "fold-out" or integral child seat having a mechanism interconnecting a seatback member, a headrest member and a seat member for causing coordinated movement therebetween. When it is desired to deploy the integral child seat, the seatback member is moved to a tilted position and the headrest member is elevated while the seat member is moved to a lowered position for establishing an upright sitting position. Additionally, the integral child seat may be deployed to a reclined position wherein the seatback member is automatically moved to a second tilted position and the headrest member is moved to a second elevated position in coordination with the movement of the seat member to a second lowered position. As a result, movement of the integral child seat between its stowed and first and second deployed positions can be accomplished with relative ease and convenience to the person attempting such movement.

16 Claims, 7 Drawing Sheets

CHILD RESTRAINT SEAT

BACKGROUND OF THE INVENTION

The present invention relates generally to child restraint seats and, more particularly, to a fold-out child seat of the type integrated into the backrest of a vehicular seating arrangement and having means for causing coordinated movement of a headrest, a seatback and a seat between their respective stowed positions and a pair of different deployed positions.

Virtually all motor vehicles are equipped with safety belt restraint systems for physically restraining the seat occupant when the vehicle is subjected to a high rate of deceleration which may occur, for example, during a motor vehicle collision. While conventional safety belt restraint systems are well-suited for restraining adult passengers, it is a common practice to use a portable (i.e., "add-on") child seat having a belt-type harness for children under a given age and weight. For instance, most portable child seats are rated for children weighing up to forty pounds and are generally recommended for use with children under the age of four years. As is known, such portable child seats are placed on top of the vehicle seat and secured thereto using the existing vehicular safety belt restraint system.

In an effort to minimize the inconvenience associated with installing and/or stowing portable child seats, some motor vehicles are now available with seating arrangements that have one or more "fold-out" child seats built-in or integrated into the backrest of an otherwise conventional seat. When needed, such an integral child seat can be deployed by rotating a seat member to a lowered position for exposing a retractable belt-type harness for restraining a child seated within the child seat. Following use, the integral child seat can be stowed by rotating the seat member to a raised position concealed within the backrest. Once stowed, the seating arrangement accommodates an adult in a normal seated position while preserving the overall cosmetic appearance and comfort of the vehicle seat. Typically, some type of latching mechanism is also provided for releasably locking the integral child seat in the stowed position. Alternatively, some integral child seats, especially those associated with bench-type seats, also include a headrest member that can be moved between a lowered stowed position and an elevated deployed position. In such applications, the latching mechanism is usually operable for releasably locking both of the headrest member and the seat member in their respective stowed and deployed positions.

As will be appreciated, motor vehicles equipped with seats having one or more fold-out type integral child seats are extremely popular in view of the enhanced convenience they provide. However, since integral child seats are typically integrated into otherwise conventional seats, various regulatory standards have been promulgated which set forth specific design criteria as well as performance and testing requirements. To comply with these standards, it is again common for the vehicle manufacturers to establish limitations on the size and weight of children using the integral child seat. Regardless of such limitations, the regulatory standards establish specific design and structural requirements that must be met. For instance, all integral child seats must meet pre-established minimum cross-sectional surface area requirements for the seatback and its lateral side support. In this light, it is recognized that belt-type harness restraints assist in providing lateral (i.e., side-to-side) support of a child strapped into the integral child seat. Most commonly, conventional belt-type harnesses are classified as either a 3-point restraint or a 5-point restraint based on the number of anchor/loading points associated therewith. While 3-point harness restraints are considered more convenient to use and are satisfactory for their intended purpose, it has been shown that 5-point harness restraints provide greater lateral support for minimizing side-to-side rolling movement of the occupant within the child seat. Unfortunately, 5-point harness restraints are not always used and/or adjusted properly which can detrimentally impact their overall restraining capabilities.

In an effort to provide enhanced lateral restraint, it has been proposed to incorporate enlarged side bolsters into at least one of the seatback and seat member of the integral child seat. The most relevant prior art known to the present invention is disclosed in U.S. Pat. No. 4,902,070 to Casale et al. which illustrates a fold-out integral child seat comprised of an upper backrest portion having a pair of integral headrest segments and a lower backrest portion having a pair of integral armrest segments. As designed, the upper backrest portion folds down over, and is latched to, the lower backrest portion such that the entire unit can then be rotated about a single pivot to a concealed position within the backrest of the vehicle seat for storage in a reduced trunk area. Unfortunately, this arrangement is extremely complex in construction, expensive to manufacture and is rather limited in function and application. Additionally, no lateral support for the shoulders and upper torso of the child appears to be provided between the headrest and armrest segments. Finally, since it is not uncommon for a person to be burdened with the job of releasing and deploying the child seat from its stowed position while holding the child in one arm, the multi-step process for deploying this integral child seat is generally considered to be awkward and cumbersome.

In view of the above, a need clearly exists to develop a fold-out type integral child seat which overcomes the shortcomings of the prior art and yet which can be readily adapted for use in various vehicular seating applications.

SUMMARY OF THE INVENTION

Accordingly, a primary object of the present invention is to provide a child safety seat of the type that is integrated into the backrest of an automotive seat system and which can be articulated between a stowed position concealed in the backrest and two different deployed positions. Thus, the present invention is directed to meeting this and other objects by providing a "fold-out" integral child seat having a movement coordinating mechanism interconnecting a headrest component, a seatback component and a seat component for causing concurrent and proportional movement therebetween. More particularly, the components of the integral child seat may be articulated from a "stowed" position concealed in the backrest of the vehicular seat to a first deployed position for establishing a substantially "upright" sitting position. In addition, the components of the integral child seat may thereafter be articulated to a second deployed position for establishing a "reclined" sleeping position. As a result, movement of the integral child seat between its stowed, upright and reclined positions can be accomplished in one operation for enhancing the convenience afforded to a person attempting such movement.

A further object of the present invention is to provide an integral child seat wherein the upholstered seatback component includes a pair of laterally-space side bolster segments to provide enhanced upper torso support for an infant strapped in the integral child seat. Similarly, the upholstered seat component includes a second pair of lateral bolsters for supporting the lower torso and hips of the infant. Once the integral child seat is articulated to either of its deployed positions, the first and second pairs of bolsters define a generally continuous pair of lateral side supports which extend substantially along the entire length of the integral child seat.

Another object is to provide a modular child seat assembly that is adapted for use in vehicular rear seating applications wherein a trunk space or storage area is located behind the vehicle seat. In one preferred arrangement, a preassembled child seat module is mountable to a reinforced base plate which, in turn, is mountable to the existing or modified vehicle chassis and/or seat frame structure to meet required load carrying standards.

Additional objects, advantages and features of the present invention will become apparent to those skilled in the art from studying the following written description and the appended claims, taken in conjunction with the accompanying drawings.

DETAILED DESCRIPTION OF THE PREFERRED EMBODIMENT

The present invention is generally directed to an improved construction for a child restraint seat which can be built-in or otherwise integrated into a passenger seating arrangement. More specifically, each of the preferred embodiments for the "fold-out" integral child seat hereinafter disclosed are particularly well-suited for use in motor vehicle rear seat applications and offer improved convenience and operational advantages over conventional integral child seats. It is to be understood that while the preferred embodiments of the present invention are hereinafter disclosed in association with one particular vehicle seating arrangement, such is merely an exemplary representation of but one type of environment to which the present invention is applicable.

Figure 1:
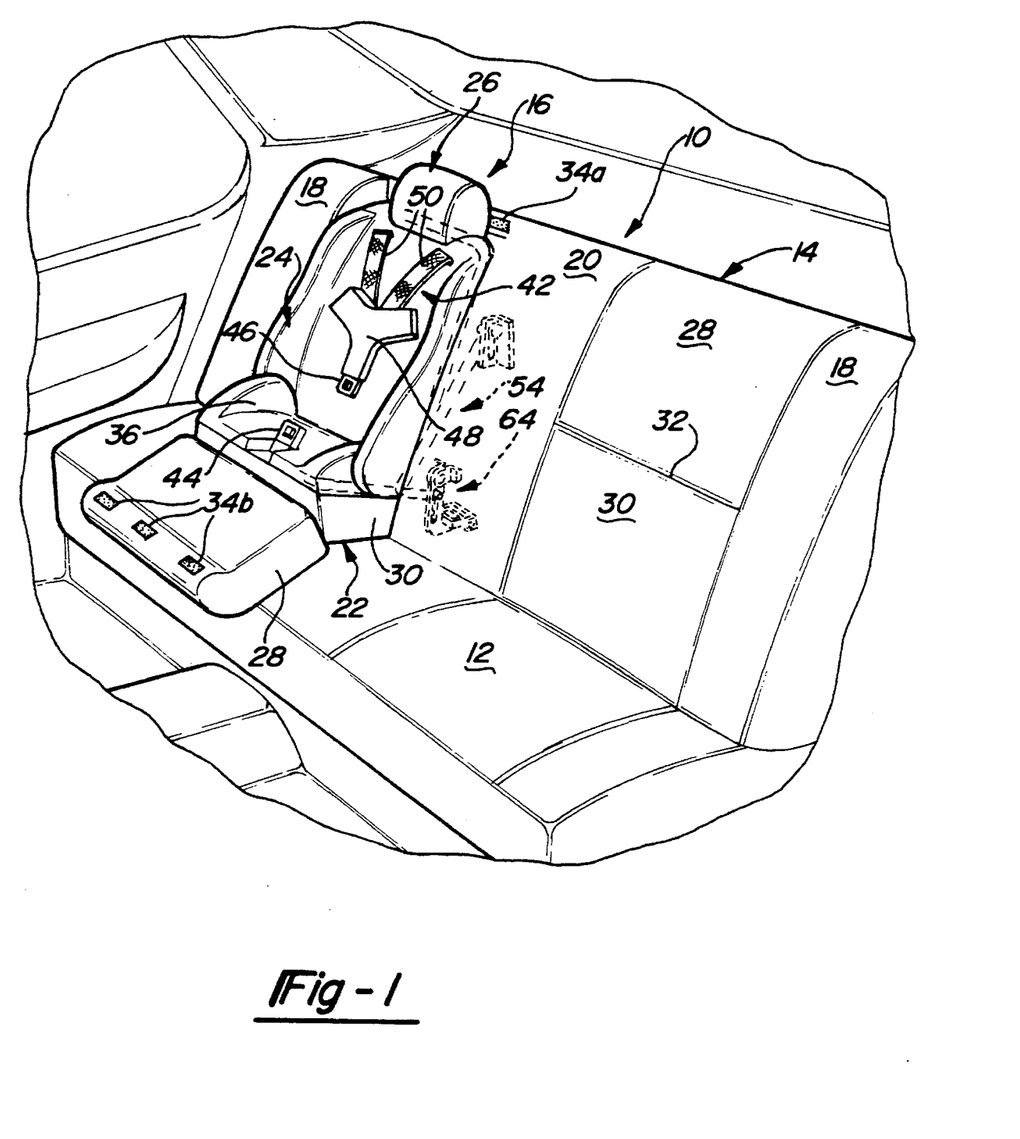
FIG. 1 is a perspective view of an exemplary rear passenger compartment showing a rear seat having a pair of integral child seats which incorporate the novel principles of the present invention and which further shows one of the integral child seats in a "stowed" position and the other integral child seat deployed to a generally "upright" sitting position.
Figure 2:
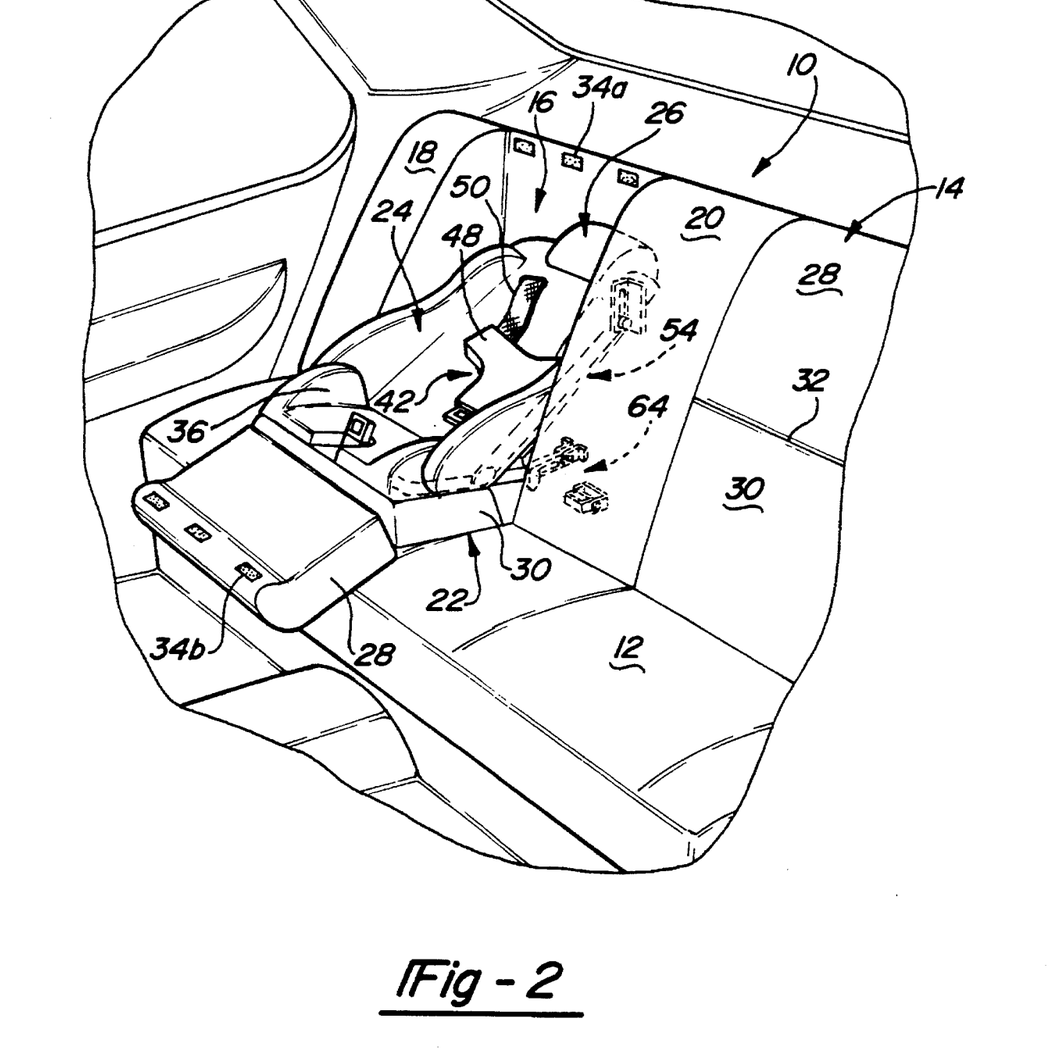
FIG. 2 is a perspective view of the exemplary rear passenger compartment showing one of the integral child seats deployed to a "reclined" sleeping position.

Referring now to the drawings, and particularly to FIGS. 1 and 2, an exemplary rear seat 10 of the type typically installed forward of the motor vehicle's trunk storage compartment is shown. In general, rear seat 10 includes a seat cushion 12, a backrest 14, and a pair of "fold-out" or integral child seats 16 incorporated into recesses formed in backrest 14 between end cushions 18 and a central cushion 20. Each integral seat 16 includes three primary components, namely, an upholstered seat assembly 22, an upholstered seatback 24 and an upholstered headrest 26. As will be described, these components of integral child seat 16 are uniquely interconnected in a manner facilitating coordinated and proportional movement thereof for establishing two different deployed positions in addition to the stowage position. Those skilled in the art will understand that rear seat 10 may alternatively be equipped with only one integral child seat if so required for a particular seating application.

As shown, one side of rear seat 10 is in a normal adult seating position with its integral child seat 16 retracted into a "stowed" position. In this stowed position, upper and lower cushions 28 and 30, respectively, of seat assembly 22 are positioned to be flush with adjacent edges of its corresponding end cushion 18 and central cushion 20 to define a continuous backrest surface such that integral child seat 16 is completely concealed. Thus, when integral child seat 16 is stowed, rear seat 10 has the function and cosmetic appearance of an otherwise conventional vehicular seat which can be used in a manner wherein the seat occupant is restrained using an existing vehicular safety belt restraint system (not shown). Upper cushion 28 is pliably connected to lower cushion 30 in a suitable manner, such as by a continuous hinged seam 32. Furthermore, upper cushion 28 of seat assembly 22 and backrest 14 each include fasteners, such as VELCRO® hook and loop fasteners 34A, 34B, for releasably securing the distal edge of upper cushion 28 to an upper edge of backrest 14 for maintaining integral child seat 16 in the stowed position. While such a VELCRO® hook and loop fastening arrangement is preferred, it will be appreciated that any suitable fastener or mechanical latching mechanism can be used for releasably securing seat assembly 22 in the stowed position.

With continued reference to FIG. 1, the integral child seat associated with the opposite side of rear seat 10 is shown extended to a first deployed position. As will be described, the first deployed position defines a generally "upright" sitting position whereat seatback 24 is forwardly tilted relative to backrest 14 and is generally orthogonally oriented relative to a booster seat 36 of seat assembly 22, while headrest 6 is raised to an elevated position relative to seatback 24 and backrest 14. As seen, bolster seat 36 extends from one side of lower cushion 30, the opposite side of which rests on seat cushion 12. Moreover, the exposed side of upper cushion 30 acts as a leg support which is substantially a continuous extension of the surface against which an infant is resting. In addition, deployment of integral child seat 16 exposes a safety belt restraint system, shown as three point belt-type harness restraint 42. An anchored belt buckle 44 extends outwardly from bolster seat 36 for releasable latched engagement with a tongue plate 46 extending from a T-bar shield 48 of harness restraint 42. While not shown, it is to be understood that harness restraint 42 also includes a belt retractor mechanism of the type permitting unrestricted payout and retraction of belt webbings 50 and T-bar shield 48 until latched engagement of tongue plate 46 with buckle 44 at which point subsequent payout is prohibited.

Finally, bolster seat 36 also includes a pair of upstanding lateral hip bolsters 52 for providing enhanced side-to-side restraint for the lower torso and hips of the infant seated in integral child seat 16.

Figure 3:
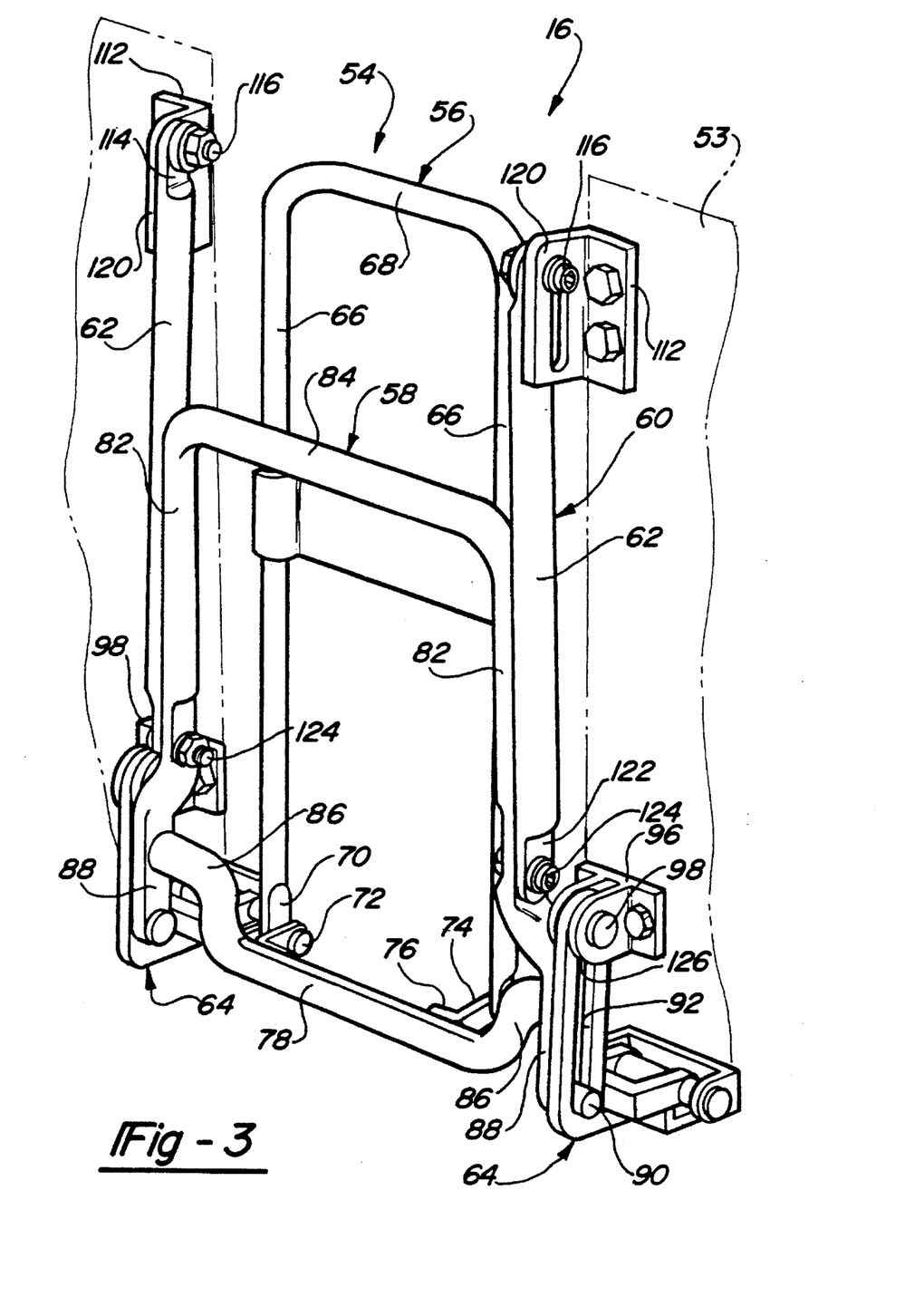
FIG. 3 is a perspective view of one of the integral child seats, with its seat pan, back support, belt restraint system, upholstery and padding removed for clarity, showing the underlying structural components associated therewith in the "stowed" position.
Figure 4:
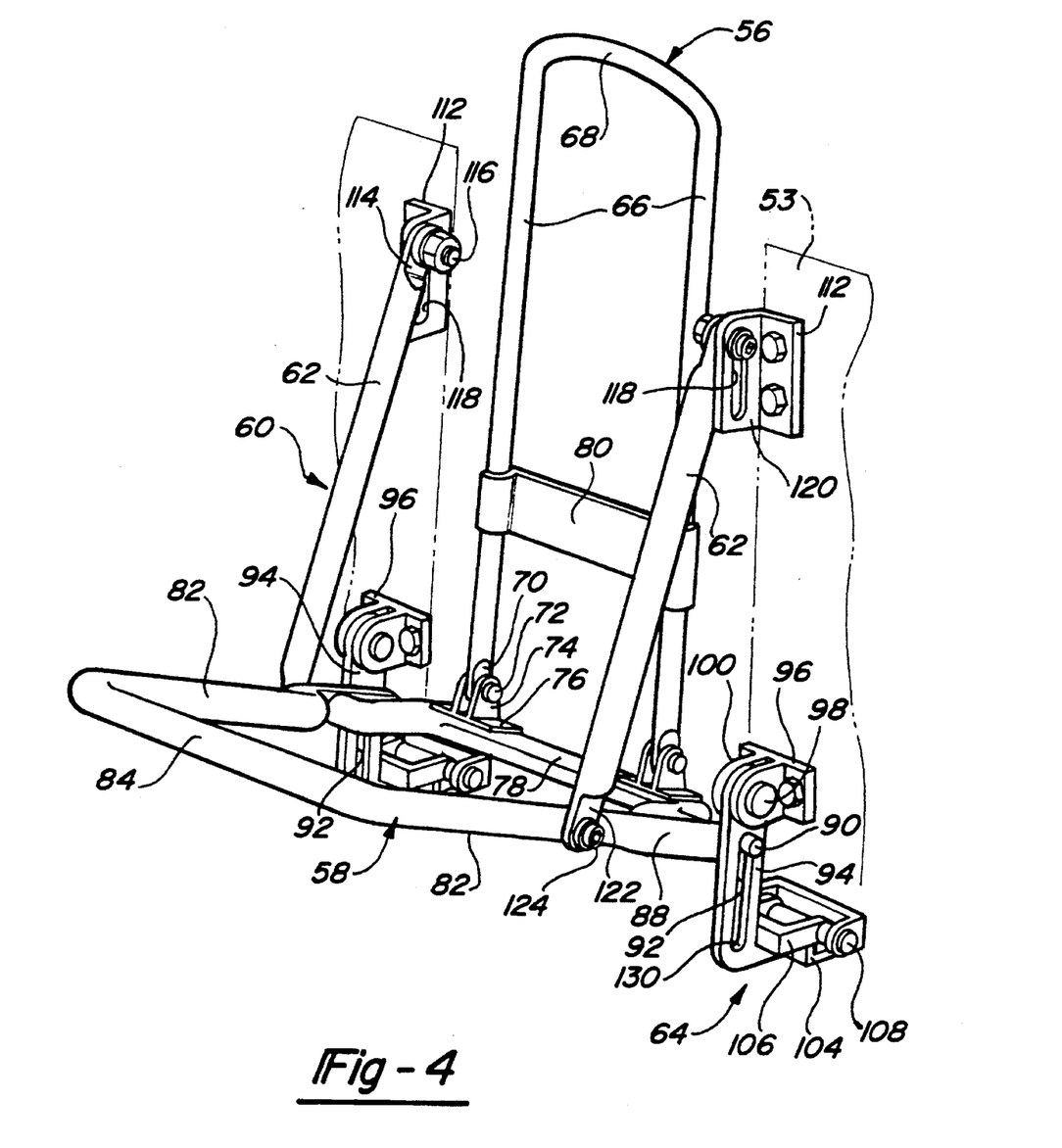
FIG. 4 is a perspective view, similar to FIG. 3, showing the underlying structural components for the integral child seat articulated to the "upright" position.
Figure 5:
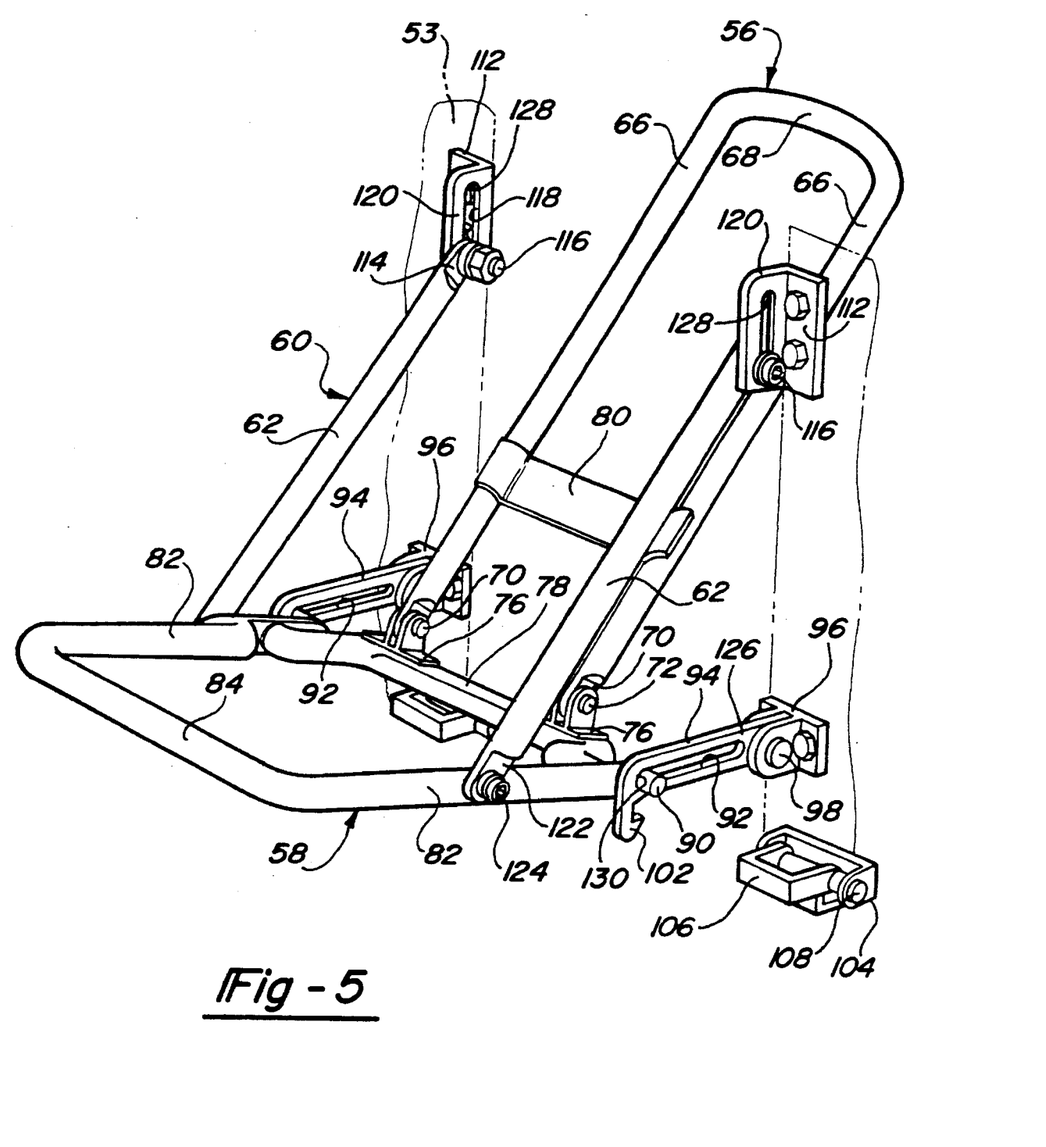
FIG. 5 is a perspective view, similar to FIGS. 2 and 3, showing the underlying structural components for the integral child seat extended to the "reclined" position.

With particular reference to FIGS. 3, 4 and 5, integral child seat 16 is shown with its belt restraint system, upholstery and padding removed to more clearly illustrate the novel structural and operational features of the present invention. In general, integral child seat 16 is a modular assembly preferably secured to a reinforced base plate partially shown in phantom lines at reference numeral 53 which, in turn, is mounted to the existing or modified frame structure of rear seat 10 or, in the alternative, to the chassis of the motor vehicle. It will be appreciated that modifications, reinforcements and/or additions might possibly be made to the underlying seat frame structure for purposes of providing adequate load carrying of the modular child seat assembly. Depending on the particular seating application, integral child seat 16 can be stowed entirely within backrest 14 or additional within a portion of the trunk area located rearward of backrest 14. While not shown, a back support associated with seatback 24 and a seat pan associated with seat assembly 22 are mounted to the tubular frame sections shown and are weight-bearing support structures, as understood by those skilled in the art.

According to its most basic function, the underlying frame structure of integral child seat 16 includes a series of sliding and/or pivoting frame components interconnected to define a frame assembly 54 that is operable for coordinating the concurrent and proportional movement of seat assembly 22, seatback 24 and headrest 26 between their respective positions when integral child seat 16 is moved between its "stowed" position (FIG. 3), its first deployed or "upright" position (FIG. 4), and its second deployed or "reclined" position (FIG. 5). Accordingly, frame assembly 54 is adapted to cause movement of seat assembly 22 between a generally vertical position when integral child seat 16 is in its "stowed" position, a first generally horizontal position when integral child seat 16 is in the "upright" position, and a second generally horizontal position when integral child seat 16 is advanced to the "reclined" position. More particularly, with seat assembly 22 in the first generally horizontal position, the front edge of bolster seat 36 is upwardly angulated relative to a horizontal plane. With seat assembly 22 in the second generally horizontal position, bolster seat 36 is moved forwardly relative to backrest 14 with its front edge again upwardly angulated, but at less of an angle relative to the horizontal plane.

Frame assembly 54 is also adapted to cause concurrent movement of seatback 24 between a generally vertical position when child seat 16 is in the "stowed" position, a first tilted position when child seat 16 is in the "upright" position, and a second tilted position when child seat 16 is in the "reclined" position. As noted, in the first tilted position seatback 24 is aligned to be generally orthogonal with respect to bolster seat 36 for establishing the "upright" sitting position. With seatback 24 in the second tilted position, an obtuse angle is established between seatback 24 and bolster seat 36 for establishing the "reclined" sleeping position. Finally, frame assembly 54 also causes movement of headrest 26 between a vertical retracted position relative to seatback 24 when integral child seat 16 is stowed, a vertical elevated position when integral child seat 16 is upright, and an elevated and reclined position when integral child seat 16 is reclined. As will be appreciated, the amount of articulated motion shown in the drawings for each of the three movable components is merely exemplary and intended only to illustrate the availability of two distinct deployment positions for integral child seat 16. Additional operational aspects of the present invention will hereinafter be described in greater detail.

With continued reference to FIGS. 3, 4 and 5, the specific structural features of frame assembly 54 will now be described in greater detail. The tubular components of frame assembly 54 generally comprise a U-shaped headrest frame 56, a generally rectangular seat frame 58, a seatback frame 60 including a pair of elongated drive links 62, and a pair of latching mechanisms 64. In particular, U-shaped headrest frame 56 includes a pair of legs 66 interconnected by an upper cross-bar 68. The distal end 70 of each leg 66 is attached for pivotal movement relative to seat frame 58 via a hinge pin 72 that is retained between a pair of upstanding lugs 74 formed on a pivot bracket 76 that are welded, or otherwise securely attached, to a rear cross-bar 78 of seat frame 58. Preferably, headrest frame 58 also includes a least one stabilizer brace 80 extending between legs 66 to provide enhanced rigidity.

Seat frame 58 is generally rectangular in shape and includes a pair of lateral side rails 82, a front cross-bar 84 and rear cross-bar 78. As noted, a suitable seat pan (not shown), lower cushion 28 and bolster seat 36 are mounted to seat frame 58 for supporting an infant seated thereon. As best seen from FIG. 3, the opposite ends of rear cross-bar 78 define offset segments 86 that are each fixed (i.e., welded) to an intermediate portion of a flattened bracket segment 88 formed at a rearward end of each side rail 82. In addition, a guide pin 90 extends outwardly from the distal end of each bracket segment 88 and is retained for sliding and pivotable movement within an elongated guide slot 92 formed in a latch link 94 associated with each latching mechanism 64.

Latch mechanisms 64 each include a first mounting bracket 96 fixed to base plate 53 and from which latch link 94 is supported for pivotable movement. Each latch link 94 has one end supported on a hinge pin 98 extending between a pair of flanges 100 formed on first mounting bracket 96 for pivotable movement relative thereto. A hook 102 is formed on the other end of each latch link 94. Latch mechanisms 64 also include a second mounting bracket 104 fixed to base plate 53 from which a spring-biased lock bar 106 is supported for pivotable movement on a hinge pin 108. In operation, hook 102 is selectively engageable with lock bar 106 for controlling movement of integral child seat 16 between its two deployed positions. When hook 102 is latched to lock bar 106, latch link 94 is prevented from pivoting for restricting articulation of integral child seat 16 between its "stowed" and "upright" positions. However, when hook 102 is released from lock bar 106, latch link 94 is free to pivot about hinge pin 98 such that integral child seat 16 can be then articulated between its "upright" and "reclined" positions. Lock bar 106 is preferably biased to the position shown in the drawings by any suitable biasing arrangement and can be selectively biased in opposition to such biasing to permit selective release of hook 102 from latched engagement therewith in response to the user pulling horizontally forward on seat assembly 22 when it is desired to move integral child seat 16 to its "reclined" position.

Upon return of integral child seat 16 to the "upright" position, latch link 94 is pivoted to cause automatic latched engagement of hook 102 with lock bar 106. In operation, the weight of an infant seated on bolster seat 36 will act to maintain child seat 16 in the "upright" position unless it is thereafter desired to move it to the "reclined" position in the manner just described. It will be appreciated that latching and release of latch links 94 relative to lock bars 106 occurs substantially synchronously for both latching mechanisms 64 and that a manually-operable release mechanism can be used, if so desired, to mechanically control operation of latch mechanisms 64 and ultimately control movement of integral child seat 16 between its two deployed positions. As will be detailed, synchronous movement of guide pins 90 within slots 92 in association with the latched relationship of hooks 102 and lock bars 106 controls the range of pivotable and forward movement of frame assembly 54.

Seatback frame 60 is shown to include a pair of laterally-spaced drive links 62 that are each pivotably connected between a slide bracket 112 and seat frame 58. Slide brackets 112 are shown to be fixedly secured to base plate 53. In general, an upper end 114 of each drive link 62 is retained for pivotable movement about a pivot pin 116 which, in turn, is retained for sliding movement within an elongated guide slot 118 formed in a flange segment 120 of slide bracket 112. A lower end 122 of each drive link 62 is pivotably coupled via a pivot pin 124 to an intermediate segment of a corresponding side rail 82 of seat frame 58. Thus, movement of seat frame 58 results in corresponding movement of seatback frame 60 as well as movement of headrest frame 56. As can be seen, the interactive relationship between the various pivots and sliding linkages provides a means for causing coordinated and proportional movement of headrest frame 56, seat frame 58 and seatback frame 60 in response to stowage or deployment of integral child seat 16.

When it is desired to move integral child seat 16 from its "stowed" position (FIG. 3) to its "upright" position (FIGS. 1 and 4) or its "reclined" position (FIGS. 2 and 5), VELCRO® fasteners 34B on upper cushion 28 are released from corresponding VELCRO® fasteners 34A on backrest 14. To articulate integral child seat 16 from its "stowed" position to its "upright" position, the user simply pulls forward on upper cushion 28 which causes lower cushion 30 to be pulled downwardly, thus causing seat frame 58 to pivot downwardly. Since hooks 102 are latched to lock bars 106, pivotable movement of latch links 94 is inhibited. This action results in guide pins 90 moving upwardly in guide slots 92 and into engagement with a first end 126 thereof. Engagement of guide pins 90 with first ends 126 of guide slots 92 acts to positively position and maintain seat frame 58 in its first generally horizontal position. Simultaneously, drive links 62 pivot about upper pivots 116 and lower pivots 124 such that lower ends 122 of drive links 62 are forwardly pivoted to move seatback frame 60 to its first tilted position. During this movement of seatback frame 60, pivot pins 116 remains in close proximity to an upper end 128 of guide slots 118. In addition, as seat frame 58 moves from its vertical position to its first generally horizontal position, rear crossbar 78 of seat frame 58 moves upwardly as guide pins 90 ride vertically upwardly within guide slots 92. This, in turn, causes headrest frame 56 to move from its vertical retracted position to its vertical elevated position.

To thereafter articulate integral child seat 16 from the "upright" position of FIG. 4 to the "reclined" position of FIG. 5, lower seat cushion 30 is pulled forward in the direction of the vehicle's front seat (not shown). By pulling lower seat cushion 30 forward, guide pins 90 act on the edge of guide slots 92 for causing latch links 94 to pivot about pivots 98, whereby hooks 102 are released from locked engagement with lock bars 106. Thereafter, seat frame 58 is forwardly advanced to its second generally horizontal position due to guide pins 90 sliding within guide slots 92 toward engagement with second ends 130 thereof. Such motion causes pivot pins 116 to move downwardly within guide slots 118 toward engagement with second end 132 thereof, whereby lower ends 122 of drive links 62 become further forwardly extended for placing seatback frame 60 in its second tilted position. Due to the pivotable connection of headrest frame 56 to seat frame 58, such forward tilting movement of seat frame 58 results in angular movement of headrest frame 56 from its vertical elevated position to its reclined elevated position so as to maintain a desired relationship relative to seatback frame 60. Accordingly, integral child seat 16 is articulated from its "upright" position to its "reclined" position. Obviously, to subsequently stow integral child seat 16 the reverse motion to that stated above is required.

Figure 6:
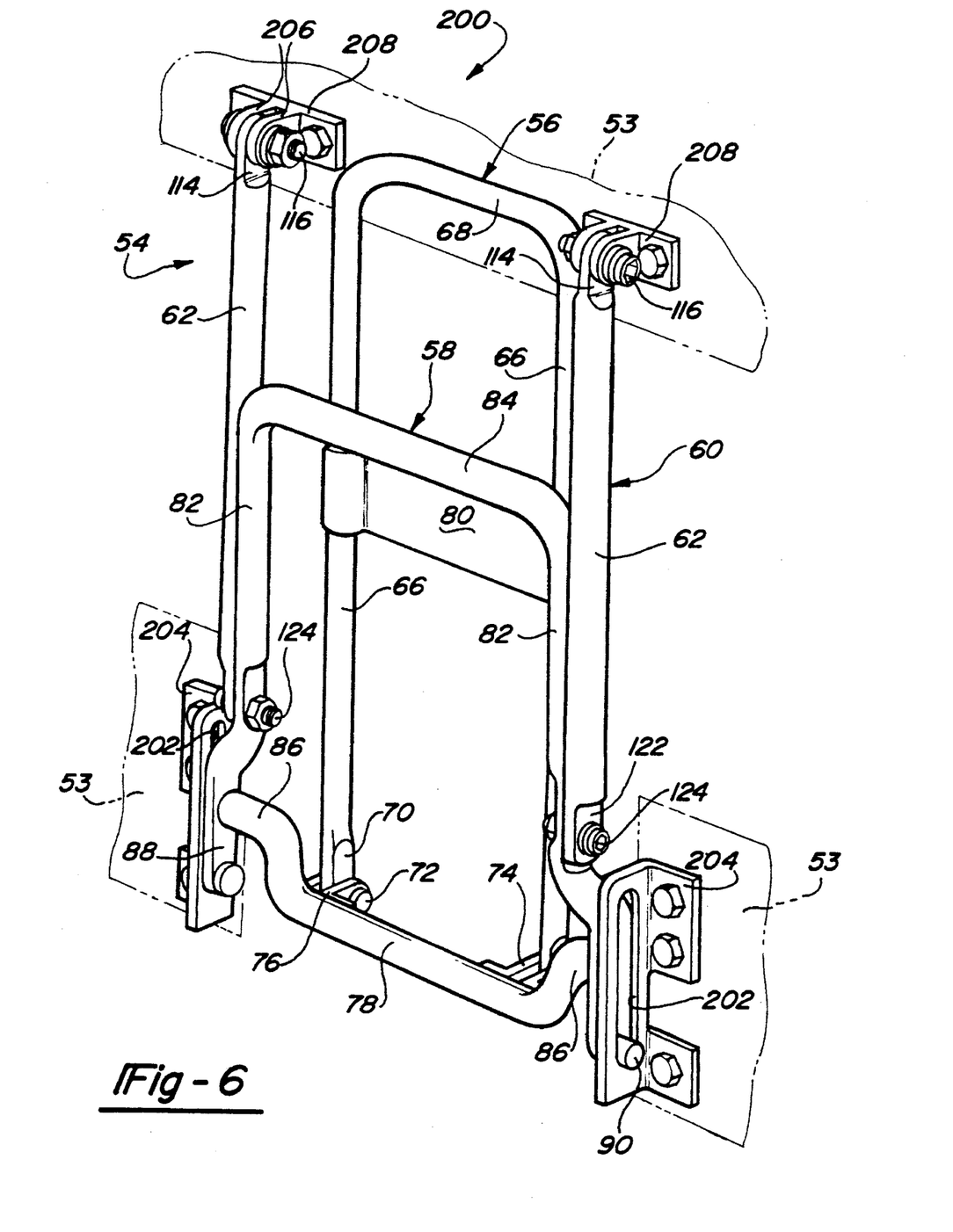
FIGS. 6 and 7 are perspective views, with various components again removed for clarity, showing the structural components associated with a modified version of the integral child seat in its "stowed" and "deployed" positions, respectively.
Figure 7:
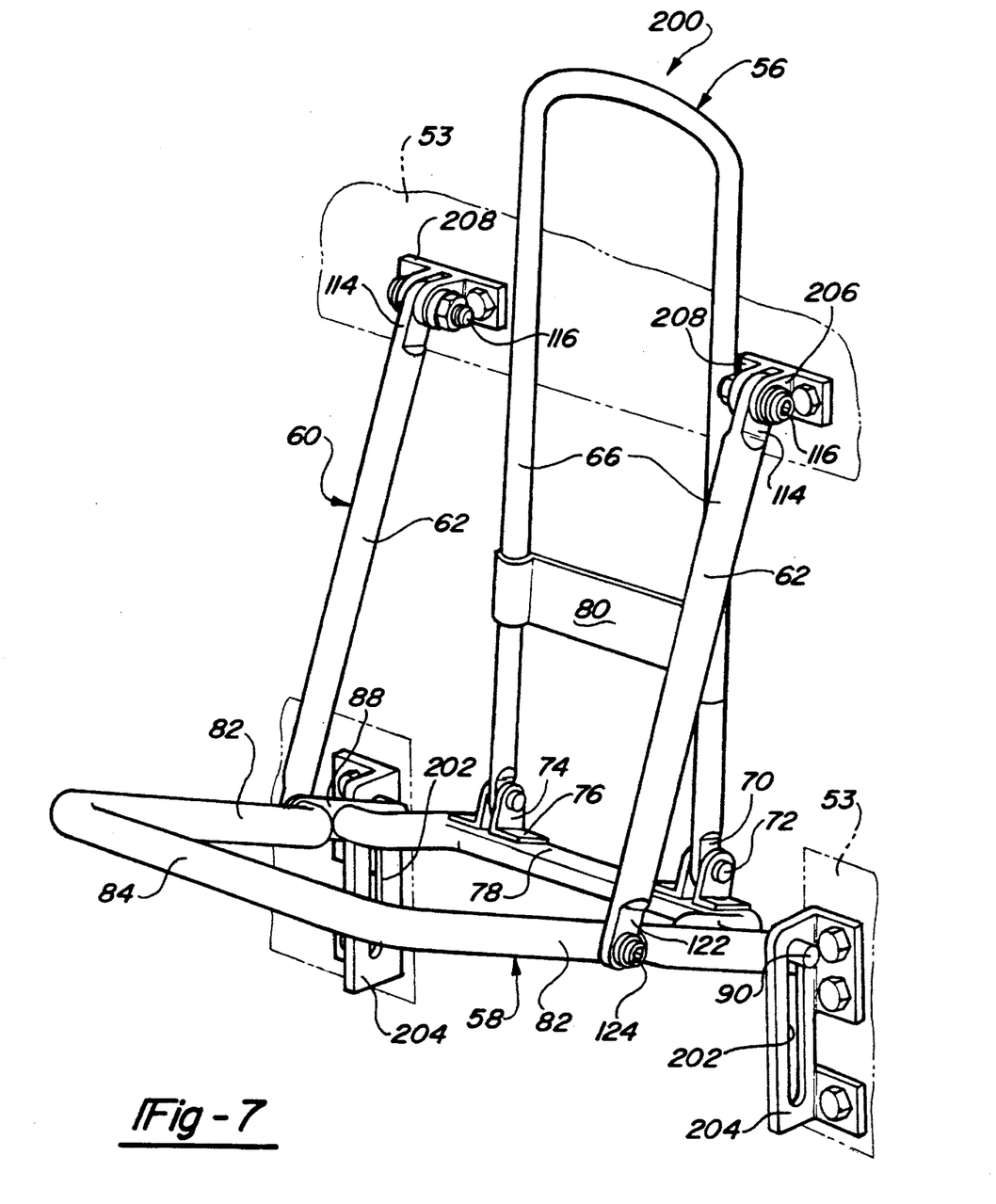

With particular reference to FIGS. 6 and 7, an alternative construction is shown for an integral child seat 200 which is similar to that previously described with the exception that only a single deployment position is available. It will be understood that integral child seat 200 is applicable for use in the seating environment shown in FIGS. 1 and 2. Moreover, due to the significant commonality of components, like reference numerals are used to designate those components that are similar in structure and/or function to those previously disclosed. For sake of brevity, only those components and features that differ from the previous detailed description will now be described.

The underlying frame structure of integral child seat 200 includes a series of sliding and/or pivoting frame components interconnected to define frame assembly 54 that functions to coordinate concurrent movement of seat frame 58 (and seat assembly 22), seatback frame 60 (and seatback 24) and headrest frame 56 (and headrest 26) between their respective positions when child seat 200 is moved between the "stowed" position of FIG. 6 and the "upright" deployed position of FIG. 7. As seen, a guide pin 90 extends outwardly from the distal end of each bracket segment 88 and which is retained for sliding and pivotal movement within an elongated guide slot 202 formed in lower mounting brackets 204 that are fixed to base plate 53. Moreover, upper end 114 of each drive link 62 is retained for pivotal movement about pivot pin 116 extending between a pair of flanges 206 formed on upper mounting brackets 208 which are likewise fixed to base plate 53. As before, the lower end 122 of each drive link 62 is pivotably coupled via pivot pin 124 to an intermediate segment of a corresponding side rail 82 of seat frame 58. Thus, the interactive relationship between the various pivoting and sliding components is again adapted to provide a means for causing coordinated and proportional movement of headrest frame 56, seat frame 58 and seatback frame 60 in response to stowage or deployment of integral child seat 200.

When it is desired to move integral child seat 200 from its "stowed" position (FIG. 6) to its "upright" position (FIG. 7), fasteners 34B on upper cushion 28 are released from corresponding fasteners 34A on backrest 14. As previously disclosed, articulation of integral child seat 200 simply requires the user to pull forward on upper cushion 28 which causes lower cushion 30 to be pulled downwardly, thus causing seat frame 58 to pivot downwardly. This action results in guide pins 90 moving upwardly in guide slots 202. More particularly, guide pins 90 move from a position of engagement with the lower end of guide slots 202 into engagement with the upper end thereof for positively positioning and maintaining seat frame 58 in its first generally horizontal position. Simultaneously, drive link 62 pivot about upper pivots 116 and lower pivots 124 such that the lower ends 122 thereof are forwardly pivoted to move seatback frame 60 to its tilted position. Due to the pivotable connection of headrest frame 56 to rear cross-bar 78 of seat frame 58, sliding upward movement of guide pins 90 within guide slots 202 causes headrest frame 56 to move from its vertical retracted position to its vertical elevated position.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A child seat integrated into a vehicle seat that is capable of being articulated between a stowed position, a first deployed position and a second deployed position reclined from said first deployed position, said child seat comprising a seat member, a seatback member, a headrest member, and a movement coordinating mechanism coupled to said seat member and pivotably connecting said headrest member and said seatback member to said seat member such that movement of said seat member causes concurrent movement of said headrest member and said seatback member relative to one another and relative to said seat member for establishing each of the stowed and first and second deployed positions, whereby said headrest member moves upwardly relative to the seatback member from said stowed to said first deployed position and said seat member moves forwardly from said first to said second deployed position and said seatback member and headrest member recline with respect to said seat member.

2. The child seat of claim 1 wherein said movement coordinating mechanism is operable for positioning said seatback member in a vertical position and said headrest member in a retracted position when said seat member is moved to a vertical position for establishing the stowed child seat position.

3. The child seat of claim 2 wherein said movement coordinating mechanism is further operable for positioning said seatback member in a first tilted position and said headrest member in an elevated position when said seat member is moved to a first generally horizontal position for establishing the first deployed child seat position, and wherein movement of said seat member to a second generally horizontal position causes concurrent movement of said seatback member to a second tilted position and said headrest member to an elevated and reclined position for establishing the second deployed child seat position.

4. The child seat of claim 3 further comprising a latching mechanism coupled to said movement coordinating mechanism and operable in a locked mode for inhibiting movement of said child seat from the first deployed position to the second deployed position and in a released mode for permitting such movement, said latching mechanism permitting a user to selectively shift between said locked and released modes.

5. The child seat of claim 3 wherein the first deployed position is a generally upright position with said seatback member being generally orthogonally aligned relative to said seat member, and wherein the second deployed position is a reclined position with said seatback member forming an obtuse angle with respect to said seat member.

6. The child seat of claim 1 wherein said seat member includes a first pair of integral bolsters formed on opposite lateral sides thereof, and said seatback member includes a second pair of bolsters formed on opposite lateral sides thereof, said first and second pairs of bolsters being aligned to form continuous bolster segments along each lateral edge of said child seat in both the first deployed and second reclined positions.

7. The child seat of claim 1 wherein said seat member includes a seat frame, said seatback member includes a seatback frame and said headrest member includes a headrest frame, and wherein said movement coordinating mechanism includes a hinge pin connecting said seatback frame to said seat frame, a pivot pin connecting said headrest frame to said seat frame, a slide bracket connected to the vehicle seat and a guide pin connected to said seatback frame and cooperative with said slide bracket.

8. A retractable child seat that is moveable between a stowed position, a first deployed position and a second deployed position reclined from said first deployed position, comprising:

a seatback member moveable between an upright storage position, a first tilted position and a second tilted position;

a seat member coupled to said seatback member for movement between a raised storage position, a first generally horizontal position and a second generally horizontal position, said seat member moving forwardly from said first to second generally horizontal position;

a headrest member coupled to said seat member for movement between a retracted storage position, a first elevated position and a second elevated position; and a movement coordinating mechanism coupled to said seat member and pivotably interconnecting said seatback member and said headrest member to said seat member for automatically moving said seatback member to said first tilted position and said headrest member to said first elevated position upwardly of said storage position in coordination with movement of said seat member to said first generally horizontal position for establishing the first deployed child seat position, for automatically moving said seatback member to said second tilted position and said headrest member to said second elevated position in coordination with movement of said seat member to said second generally horizontal position for establishing the second deployed child seat position, and for automatically moving said seatback member to said upright storage position and said headrest member to said retracted storage position in coordination with movement of said seat member to said raised storage position for establishing the stowed child seat position.

9. The child seat of claim 7 further comprising a latching mechanism coupled to one of said seatback member, seat member and headrest member and operable in a locked mode for inhibiting movement of said child seat from the first deployed position to the second deployed position and in a released mode for permitting such movement, said latching mechanism permitting a user to selectively shift between said locked and released modes.

10. The child seat of claim 8 wherein the first deployed position is a generally upright position with said seatback member being generally orthogonally aligned relative to said seat member, and wherein the second deployed position is a reclined position with said seatback member forming an obtuse angle with respect to said seat member.

11. The child seat of claim 8 wherein said seat member includes a first pair of integral bolsters formed on opposite lateral sides thereof and said seatback member includes a second pair of bolsters formed on opposite lateral sides thereof, wherein said first and second pairs of bolsters are aligned to form substantially continuous bolster segments along each lateral edge of said child seat in its first and second deployed positions.

12. The child seat of claim 7 wherein said movement coordinating mechanism includes a hinge pin connecting said seatback member to said seat member and a pivot pin connecting said headrest member to said seat member.

13. A motor vehicle seat comprising:

an upholstered seat;

an upholstered backrest; and a retractable child seat mounted to a frame structure of said backrest so as to be positioned within a recess forced therein, said child seat including a seat member coupled to said frame structure for movement between a raised storage position, a first lowered position and a second lowered position reclined from said first deployed position, a seatback member pivotally coupled to said seat member for movement between an upright storage position, a first tilted position and a second tilted position, a headrest member pivotably coupled to said seat member for movement between a retracted storage position, a first elevated position upwardly of said storage position and a second elevated position such that said seatback member moves to said first tilted upright position and said headrest member moves to said first elevated position in coordination with movement of said seat member to said first horizontal position for establishing a first deployed child seat position, such that said seatback member moves to said second tilted position and said headrest member moves to said second elevated position in coordination with movement of said seat member forwardly to a second spaced horizontal position for establishing a second child seat position, and such that said seatback member moves to said upright storage position and said headrest member moves to said retracted storage position in coordination with movement of said seat member to said raised storage position for establishing a stowed child seat position.

14. The motor vehicle seat of claim 11 wherein said seatback member includes a pair of laterally-spaced drive links each having a first end pivotally coupled to said frame structure of said backrest and a second end pivotally coupled to said seat member, wherein said headrest member is pivotably coupled to said seat member rearwardly of said second end of said seatback member, and wherein said seat member includes a guide pin retained for sliding and pivotal movement with an elongated guide slot formed in a pivotable latch link secured to said frame structure of said backrest, whereby movement of said seat member from said raised storage position to said first lowered position causes said guide pins to pivot and slide within said guide slots for causing concurrent movement of said headrest member to said first elevated position and pivotal movement of said drive lines for moving same to said first tilted position.

15. The motor vehicle seat of claim 12 further comprising a latch mechanism releasably coupling at least one of said seat member, seat back member and headrest member to said frame structure and operable in a released mode for permitting pivotal movement of said latch links and in a locked me;de for inhibiting pivotal movement thereof, whereby in said released mode pivotal movement of said latch links permits further pivotal and sliding movement of said guide pins with said guide slots for moving said seat member to said second lowered position which in turn results in movement of said headrest member to said second elevated position and movement of said drive links to said second tilted position.

16. The motor vehicle seat of claim 15 wherein said first deployed position iS a generally upright position with said seatback member being generally orthogonally aligned relative to said seat member, and wherein said second deployed position is a reclined position with said seatback member forming an obtuse angle with respect to said seat member.

* * * * *

UNITED STATES PATENT AND TRADEMARK OFFICE
CERTIFICATE OF CORRECTION

PATENT NO. : 5,564,780
DATED : October 15, 1996
INVENTOR(S) : Dwight W. Presser et al.

It is certified that error appears in the above-indentified patent and that said Letters Patent is hereby corrected as shown below:

Column 10, line 48, claim 9, "7" should be --8--.

Column 11, line 3, claim 12, "7" should be --8--.

Column 11, line 12, claim 13, "forced" should be --formed--.

Column 12, line 1, claim 14, "11" should be --13--.

Column 12, line 17, claim 14, "lines" should be --links--.

Column 12, line 18, claim 15, "12" should be --14--.

Column 12, line 23, claim 15, "me;de" should be --mode--.

Column 12, line 32, claim 16, "iS" should be --is--.

Signed and Sealed this

Fourth Day of March, 1997

Attest:

BRUCE LEHMAN

*Attesting Officer*     Commissioner of Patents and Trademarks